United States Patent
Yoshida et al.

(10) Patent No.: US 7,359,785 B2
(45) Date of Patent: Apr. 15, 2008

(54) STARTING DEVICE FOR MOTOR VEHICLES

(75) Inventors: Susumu Yoshida, Mitaka (JP); Yoshikazu Oota, Isehara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 511 days.

(21) Appl. No.: 11/143,946

(22) Filed: Jun. 3, 2005

(65) Prior Publication Data

US 2005/0272558 A1 Dec. 8, 2005

(30) Foreign Application Priority Data

Jun. 3, 2004 (JP) .............................. 2004-166180

(51) Int. Cl.
*B60K 41/20* (2006.01)
*G06F 17/00* (2006.01)

(52) U.S. Cl. ...................... 701/53; 701/67; 477/166; 477/181

(58) Field of Classification Search ................ 701/51, 701/53, 67; 477/5, 6, 8, 13, 166, 180–181
See application file for complete search history.

(56) References Cited

U.S. PATENT DOCUMENTS 5,630,772 A * 5/1997 Tsukamoto et al. ........... 477/95
7,294,091 B2 * 11/2007 Yasui ............................ 477/80

FOREIGN PATENT DOCUMENTS

| EP | 1 174 303 A2 | 1/2002 |
| FR | 2 839 927 A1 | 11/2003 |
| FR | 2 840 660 A1 | 12/2003 |
| JP | 2001-116067 A | 4/2001 |

* cited by examiner

*Primary Examiner*—Yonel Beaulieu
(74) *Attorney, Agent, or Firm*—Foley & Lardner LLP (57) ABSTRACT

A starting device has a friction element arranged between an engine and wheels for transmitting torque between them. The engagement and disengagement of the element is shifted by press force outputted from a press force applier, which is controlled by a control unit. The control unit includes a creep demand degree judging means judging a driver's creep demand degree for starting a motor vehicle after substantial stop of the vehicle with applying brake force to the wheels and outputs a creep demand degree signal, a creep time setting means setting creep time based on the creep demand degree signal and outputs a creep time signal, and a creep torque producing means producing creep torque by controlling the press force to obtain a slipping state of the element for a period determined based on the creep time signal.

20 Claims, 4 Drawing Sheets

PRIOR ART

STARTING DEVICE FOR MOTOR VEHICLES

BACKGROUND OF THE INVENTION

1. Field of the Invention

The present invention relates to a starting device for motor vehicles that is provided with a friction element arranged between an engine and wheels and capable of producing creep torque by slipping the friction element.

2. Description of the Related Art

A starting device for motor vehicles of this kind is disclosed in Japanese patent laying-open publication No. 2001-116067. This starting device is arranged between an engine and a transmission and decreases clutch torque when a motor vehicle is stopped by braking operation. By reducing the clutch torque at two stages, the starting device produces strong creep torque for creep of the vehicle for a predetermined period in preparation for a quick response to restart for a short time from vehicle stop, and after the period produces weak creep torque so as to protect a clutch from deterioration in its durability and save fuel.

The above known conventional starting device, however, encounters a problem that the creep torque can not satisfy fuel saving, clutch durability, and a restart response at a time, because the predetermined period for producing the creep torque is fixed. Specifically, it produces the creep torque for the predetermined fixed period in a case where a driver wants no creep of the vehicle, causing deterioration in clutch durability and fuel economy, and after the predetermined time, it can not produce the creep torque for moving the vehicle although the driver wants creep of the vehicle, causing degradation in response time for restarting the vehicle.

It is, therefore, an object of the present invention to provide a starting device for motor vehicles which overcomes the foregoing drawbacks and can produce creep torque to meet a driver's demand for creep of a motor vehicle.

SUMMARY OF THE INVENTION

According to a first aspect of the present invention there is provided a starting device for motor vehicles comprising: a friction element arranged between an engine and wheels and capable of transmitting torque between the engine and the wheels; a press force applier capable of applying press force to the friction element; and a control unit that controls the press force so that a torque transmission state of the friction element can be changed from a disengagement state of interrupting torque flow between the engine and the wheels to an engagement state of completely transmitting the torque therebetween without a slippage of the friction element, wherein the control unit includes a creep demand degree judging means that judges a creep demand degree of a driver for starting a motor vehicle after substantial stop of the motor vehicle with applying brake force to the wheels and outputs a creep demand degree signal, a creep time setting means that sets creep time based on the creep demand degree signal and outputs a creep time signal, and a creep torque producing means that produces creep torque by controlling the press force to obtain a slipping state of the friction element for a period determined based on the creep time signal.

BRIEF DESCRIPTION OF THE DRAWINGS

The objects, features and advantages of the present invention will become apparent as the description proceeds when taken in conjunction with the accompanying drawings, in which.

DETAILED DESCRIPTION OF THE PREFERRED EMBODIMENTS

Throughout the following detailed description, similar reference characters and numbers refer to similar elements in all figures of the drawings, and their descriptions are omitted for eliminating duplication.

A starting device for motor vehicles of an embodiment according to the present invention will be described in detail with the accompanying drawings.

Figure 1:
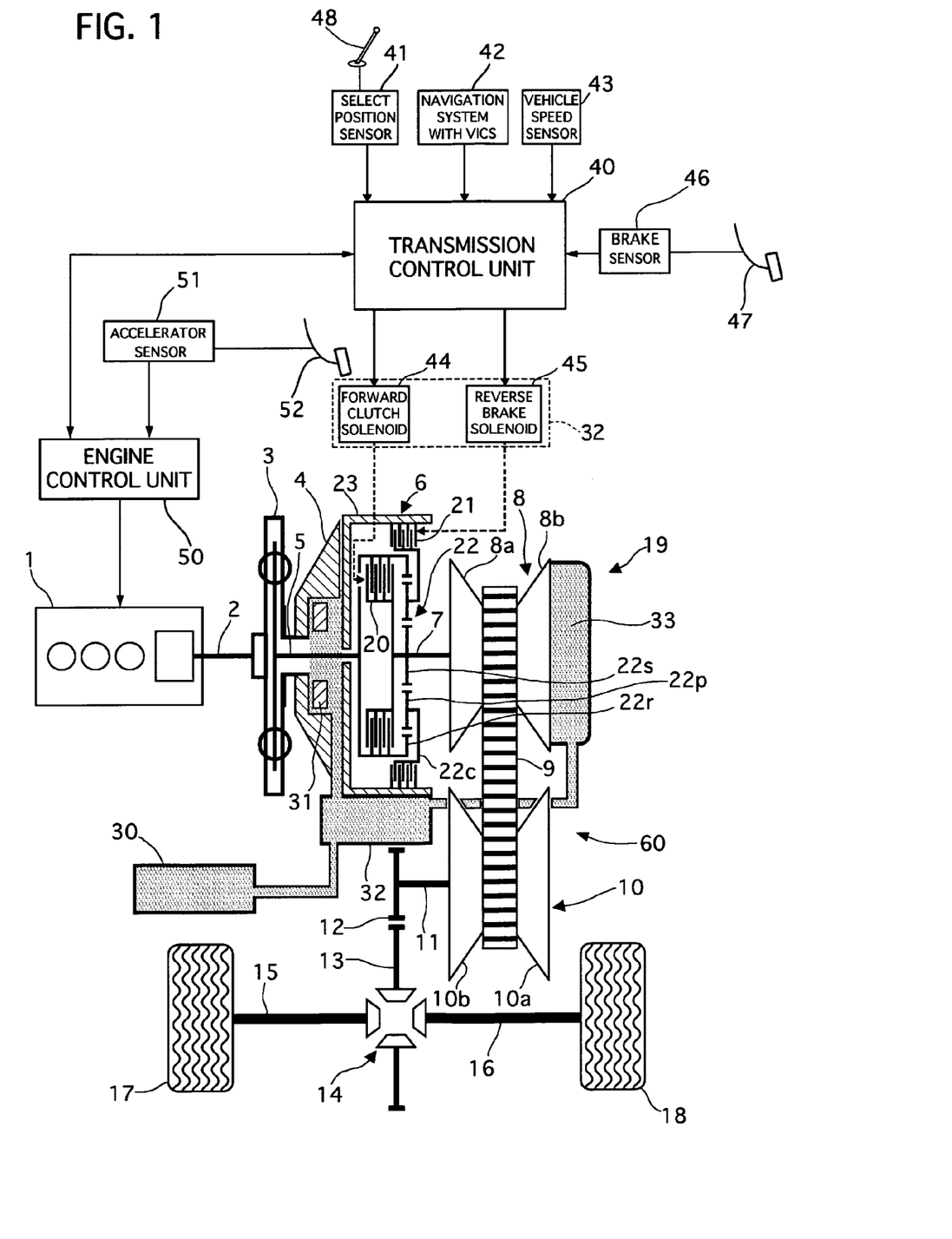
FIG. 1 is a schematic diagram showing a power train that includes a continuously variable transmission with a starting device of an embodiment according to the present invention.

FIG. 1 shows a schematic diagram showing a power train that includes a continuously variable transmission (hereinafter referred to as "CVT") 19 equipped with the starting device of the embodiment.

The CVT 19 is a belt-type transmission used for motor vehicles, and its input shaft 5 is connected with an output shaft 2 of an internal combustion engine 1 through a torsional damper 3 connected with a flywheel 4. It has a forward-backward shifting mechanism 6, a variator 60 consisting of a primary and secondary pulleys 8 and 10 and a metal push belt 9 connecting the pulleys 8 and 10, a final drive equipped with an output pinion 12 and a drive gear 13 in mesh with the pinion 12, and a differential gear sets 14.

The forward-backward shifting mechanism 6 has a single-pinion type planetary gear set 22, a forward clutch 20, and a reverse brake 21. The forward clutch 20 and the reverse brake 21 act as a friction element of the present invention, respectively.

The planetary gear set 22 includes a sun gear 22s, a ring gear 22r arranged in coaxial with the sun gear 22s, and plural planetary pinions 22p rotatably supported by a pinion carrier 22c and meshing with the sun gear 22s and the ring gear 22r. The sun gear 22s is connected with a driven part of the forward clutch 20 and a primary pulley shaft 7, the pinion carrier 22c is connected with a rotatable part of the reverse brake 21, and the ring gear 22r is connected with a drive part of the forward clutch 20 and the input shaft 5. The input shaft 5 is driven by the engine 1 through the torsional dumper 3 and connected with an oil pump 31 to drive it.

The forward clutch 20 has multi friction plates consisting of drive friction plates splined on the drive side of the clutch 20 and driven friction plates splined on the driven side of the clutch 20 so that the plates engage with each other to transmit torque between the input shaft 5 and the primary pulley shaft 7 when a not-shown piston is supplied with pressured oil, while they disengages from each other to interrupt torque flow therebetween when no pressure oil is applied to the piston.

The reverse brake 21 has multi friction plates consisting of fixed side friction plates splined on an inner side of a transmission case 23 and rotatable friction plates splined on its rotatable side connected with the pinion carrier 22c so that the plates are engaged with each other by a not-shown piston to stop the rotatable friction plates when pressured oil is applied to the piston, and disengages from each other to allow the rotatable friction plates to rotate when no pressure oil is applied to the piston.

The variator 60 is equipped with a primary pulley 8, a secondary pulley 10 arranged in parallel with the primary pulley 8, and the metal push belt 9 connecting with the primary and secondary pulleys 8 and 10.

The primary pulley 8 has a primary fixed sheave 8*a* integrally connected with the primary pulley shaft 7 and a movable sheave 8*b* supported on the primary shaft 7 and capable of rotating together with and moving along the shaft 7 toward and away from the primary fixed sheave 8*a* so as to change a groove width of the primary pulley 8. The primary fixed sheave 8*a* and the primary movable sheave 8*b* are formed to have a cone-shaped belt-contacting surface to face each other. The cone-shaped belt-contacting surfaces of the fixed and movable sheaves 8*a* and 8*b* form a primary variable groove therebetween so as to receive the belt 9. The movable sheave 8*b* is formed at its back side with a primary pressure oil chamber 33 so as to push the movable sheave 8*b* toward the fixed sheave 8*a*.

The secondary pulley 10 has a secondary fixed sheave 10*a* integrally formed with a secondary pulley shaft 11 and a secondary movable sheave 8*b* supported on the shaft 11 and capable of rotating together with and moving along the shaft 11 toward and away from the secondary fixed sheave 10*b* so as to change a groove width of the secondary pulley 10. The secondary fixed sheave 10*a* and the secondary movable sheave 10*b* are formed with a cone-shaped belt-contacting surface to face each other. The cone-shaped belt-contacting surfaces of the fixed and movable sheaves 10*a* and 10*b* form a secondary variable groove therebetween so as to receive the belt 9. The movable sheave 10*b* is pushed toward the fixed sheave 10*a* by a not-shown spring arranged behind the movable sheave 10*b*. The movable sheave 10*b* may be formed with a secondary pressure oil chamber for applying thrust force to the movable sheave 10*b* at its back side instead of the spring.

Note that the fixed sheave 8*a* and the movable sheave 8*b* of the primary pulley 8 are arranged at positions opposite to those of the secondary pulley 10, which prevents the belt 9 from being twisted due to the movements of the movable sheaves 8*b* and 10*b* of the primary and secondary pulleys 8 and 10.

The metal push belt 9 includes hundreds of belt elements and two sets of around ten laying metal belts arranged on and engaged with the both sides of the elements to carry them. The elements contact at their both tapered sides with the belt-contacting surfaces of the fixed and movable sheaves 8*a*, 8*b*, 10*a* and 10*b* of the primary and secondary pulleys 8 and 10 so as to transmit torque between them.

The secondary pulley shaft 11 is integrally formed with the output pinion 12, which meshes with the drive gear 13. The drive gear 13 drives a left and right wheels 17 and 18 through the differential gear set 14 and a left and right drive shafts 15 and 16 respectively connected with side gears of the gear set 14.

The CVT 19 is also equipped with a hydraulic control system and an electronic control system in order to control the variator 60.

The primary pressure oil chamber 33 is fluidically connected to the oil pump 31 through a hydraulic control unit 32 that controls supply and release of the pressured oil to the forward clutch 20 and the reverse brake 21 so as to engage or disengage them. For this purpose, the hydraulic control unit 32 contains a forward clutch solenoid 44 and a reverse brake solenoid 45.

The forward clutch solenoid 44 and the reverse brake solenoid 45 are constituted of a duty ratio controlled electromagnetic solenoid and driven under pulse wide modulation (PWM) control. Accordingly, the solenoids 44 and 45 are electrically connected to a transmission control unit 40. Note that the solenoids 44 and 45 are illustrated separately from the hydraulic control unit 32 for convenience, but they are contained in the hydraulic control unit 32, which is also shown by a dotted frame 32.

The clutch solenoid 44 can produce and supply pressured oil for complete engagement or slip of the clutch 20 to drive the primary pulley shaft 7 and release the pressured oil for disengagement of the clutch 20 to interrupt torque flow between the input and primary pulley shafts 5 and 7.

The brake solenoid 45 can produce and supply pressured oil for engagement of the reverse brake 21 to stop rotation of the pinion carrier 22*c* and release the pressured oil for disengagement of the brake 21 to allow the carrier 22*c* to rotate.

The pump 31 is fluidically connected to the hydraulic control unit 32 at its output side so as to supply pressurized oil thereto and an oil reservoir 30 at its input side so as to suck oil therefrom.

The forward clutch solenoid 44, the reverse brake solenoid 45, the hydraulic control unit 32, and the oil pump 31 act as a press force applier of the present invention.

The solenoids 44 and 45 are electrically connected to the transmission control unit 40, and the control unit 40 is electrically connected to a select position sensor 41 of a select lever 48, a navigation system with a Vehicle Information and Communication System (VICS) 42, a vehicle speed sensor 43, a brake sensor 46 of a brake pedal 47, and an engine control unit 50. Incidentally, the VICS is a Japan traffic information system, which provides the driver on the vehicle with road and traffic information including information on traffic congestion and restrictions in real time by using a wireless system such as beacon system or a FM multiple broadcasting system.

The engine control unit 50 is electrically connected to an accelerator sensor 51 of an accelerator pedal 52. The accelerator sensor 51 detects an accelerator pedal position and outputs an accelerator pedal position signal to the engine control unit 50, which is electrically connected to the transmission control unit 40 so that it can send the accelerator pedal position signal to the transmission control unit 40.

The select position sensor 41 detects a select position of the select lever 48 and outputs a select position signal to the transmission control unit 40. The navigation system 42 detects a present vehicle position of a motor vehicle and outputs a vehicle position signal to the control unit 40. The VICS catches a traffic volume of roads and a traffic volume signal is sent to the control unit 40. The traffic volume obtained from the VICS is preferably limited to an area including the detected present position of the vehicle and its periphery. The vehicle speed sensor 43 detects a vehicle speed and outputs a vehicle speed signal to the control unit 40. The brake sensor 46 detects press/release of the brake pedal 47 and outputs a brake signal to the control unit 40.

Figure 2:
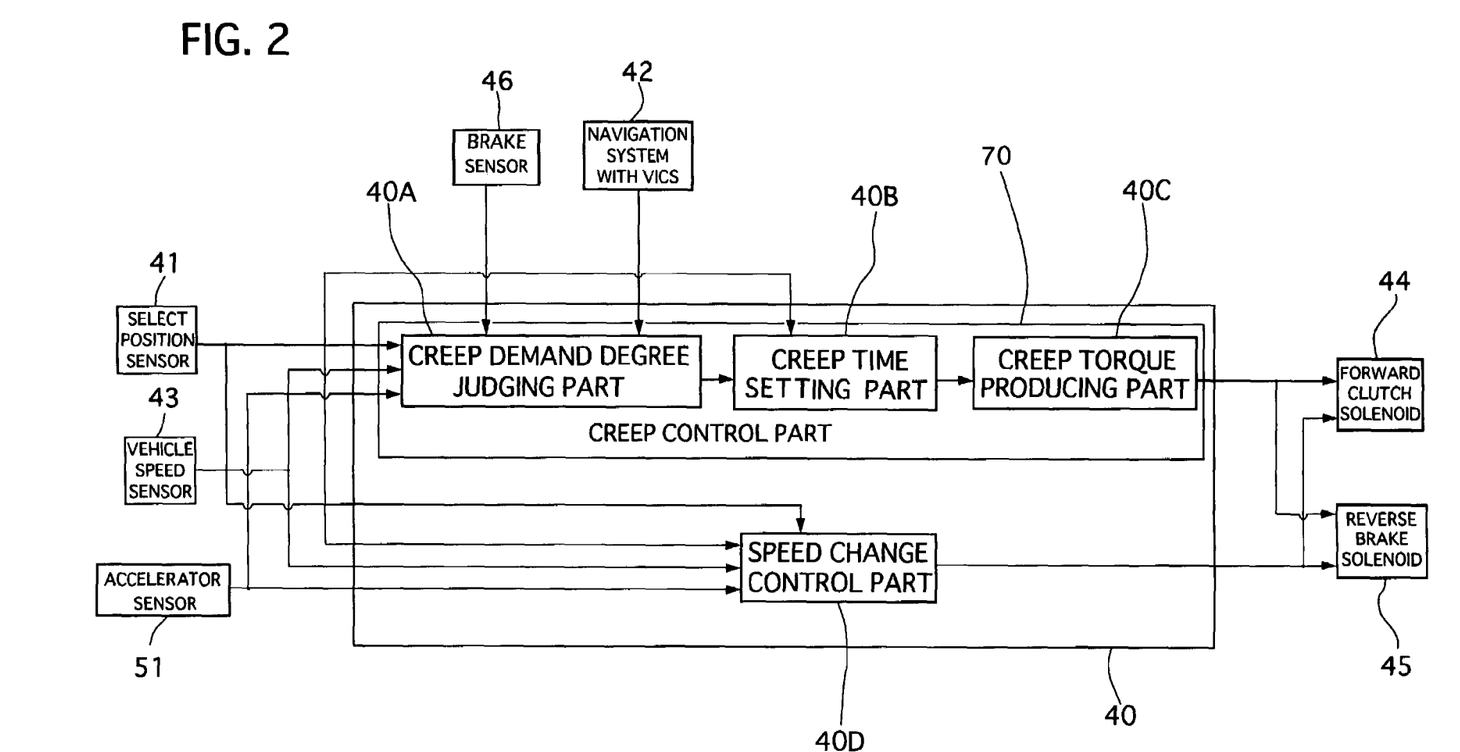
FIG. 2 is a control block diagram of a transmission control unit that controls the staring device and the continuously variable transmission shown in FIG. 1.

The transmission control unit 40 has a creep control part 70 including a creep demand degree judging part 40A, a creep time setting part 40B, and a creep torque producing part 40C and a speed change control part 40D as shown in FIG. 2. The transmission control unit 40 acts as a control unit of the present invention.

The creep demand degree judging part 40A is electrically connected to the select position sensor 41, the vehicle speed sensor 43, the accelerator sensor 51, the brake sensor 46, and the navigation system with the VICS 40B and judges a creep demand degree of a driver to output a creep demand degree signal. The creep demand degree judging part 40A acts as a creep demand degree judging means of the present invention.

The creep time setting part 40B is electrically connected to the creep demand degree judging part 40A so as to receive the creep demand degree signal and determines creep time for producing creep torque, for example no creep time, middle creep time, long creep time in this embodiment, based on the creep demand degree signal and outputs a creep time signal. The creep time setting part 40B acts as the creep setting means of the present invention.

The creep torque producing part 40C is electrically connected to the creep time setting part 40B and the select position sensor 41 so as to receive the creep time signal and the select position signal, respectively, and outputs a creep torque signal determined based on the creep time and the select position to a not-shown power supply device. The creep torque producing part 40C acts as a creep torque producing means of the present invention.

The power supply device supplies its electric power to one of the forward clutch solenoid 44 and the reverse brake solenoid based on the select position: the clutch solenoid 44 receives the power when the select position is forward running position, while the brake solenoid 45 receives the power when the select position is backward running position. The power is outputted and received for the above creep time determined by the creep time setting part 40B.

The speed change control part 40D is electrically connected to the select position sensor 41, a vehicle speed sensor 43, an accelerator sensor 51, and a not-shown rotational speed sensor of the primary pulley and determines control pressure to be supplied to the primary pressure oil chamber 33 based on signals outputted from the above sensors. The control pressure is set higher as a speed ratio of the variator 60 becomes larger, so that the vehicle can run at a high speed.

The operation of the starting device of the embodiment will be described.

When the vehicle is parked in a neutral position or a parking position, the transmission control unit 40 de-energizes the clutch solenoid 44 and the brake solenoid 45, resulting in disengagement of the forward clutch 20 and the reverse brake 21. Accordingly, the primary shaft 7 is not rotated even when the engine 1 is in operation.

When a driver shifts the select lever 48 from the neutral position or the parking position and presses the accelerator pedal 52, the transmission control unit 40 controls the clutch solenoid 44 to be energized and supply pressurized oil to the forward clutch 20 so that it can be engaged to transmit drive torque outputted from the engine 1 to the primary shaft 7. In this state, the clutch 20 is engaged, but the brake 21 is not applied, because the brake solenoid 45 is de-energized, which brings a gear ratio of the planetary gear set 22 to be 1.00. The primary shaft 7 drives the primary pulley 8, which is controlled based on a select position, a vehicle speed, an accelerator pedal position, and others so as to change its groove width. This change of the groove width causes the groove width of the secondary pulley to be changed, resulting in changes of radiuses of belt 9 at the primary and secondary pulley 8 and 10. By this change, the variator 60 can provide a variable speed ratio according to a vehicle running conditions. The speed ratio of the variator 60 is set larger as the vehicle speed becomes higher. The output from the variator 60 is transmitted to the final drive consisting of the pinion 12 and the ring gear 13, where the rotational output speed is reduced, and then to the differential gear set 14. The differential gear set 14 divided the drive power to the left and right wheels 17 and 18 through the drive shafts 15 and 16, so that it propels the vehicle forward.

On the other hand, when the driver shifts the select lever 48 from the neutral position or the parking position and presses the accelerator pedal 52, the transmission control unit 40 controls the reverse brake solenoid 45 to be energized and supply the pressured oil to the reverse brake 21 so that it can be engaged to halt the pinion carrier 22c. This causes the planetary gear set 22 to rotate in a reverse direction, and thereby drive the primary pulley 8 in the reverse direction through primary shaft 7. Similarly to the forward running operation described above except its rotational direction, the engine output is transmitted to the wheels 17 and 18 through the variator 60 and others.

When the driver wants vehicle stop, he or she releases the accelerator pedal 52 and presses the brake pedal 47 to reduce the vehicle speed down to zero. This vehicle stop is detected by the transmission control unit 40, and it starts creep control by slipping the clutch 20 or the brake 21 as follows.

Figure 3:
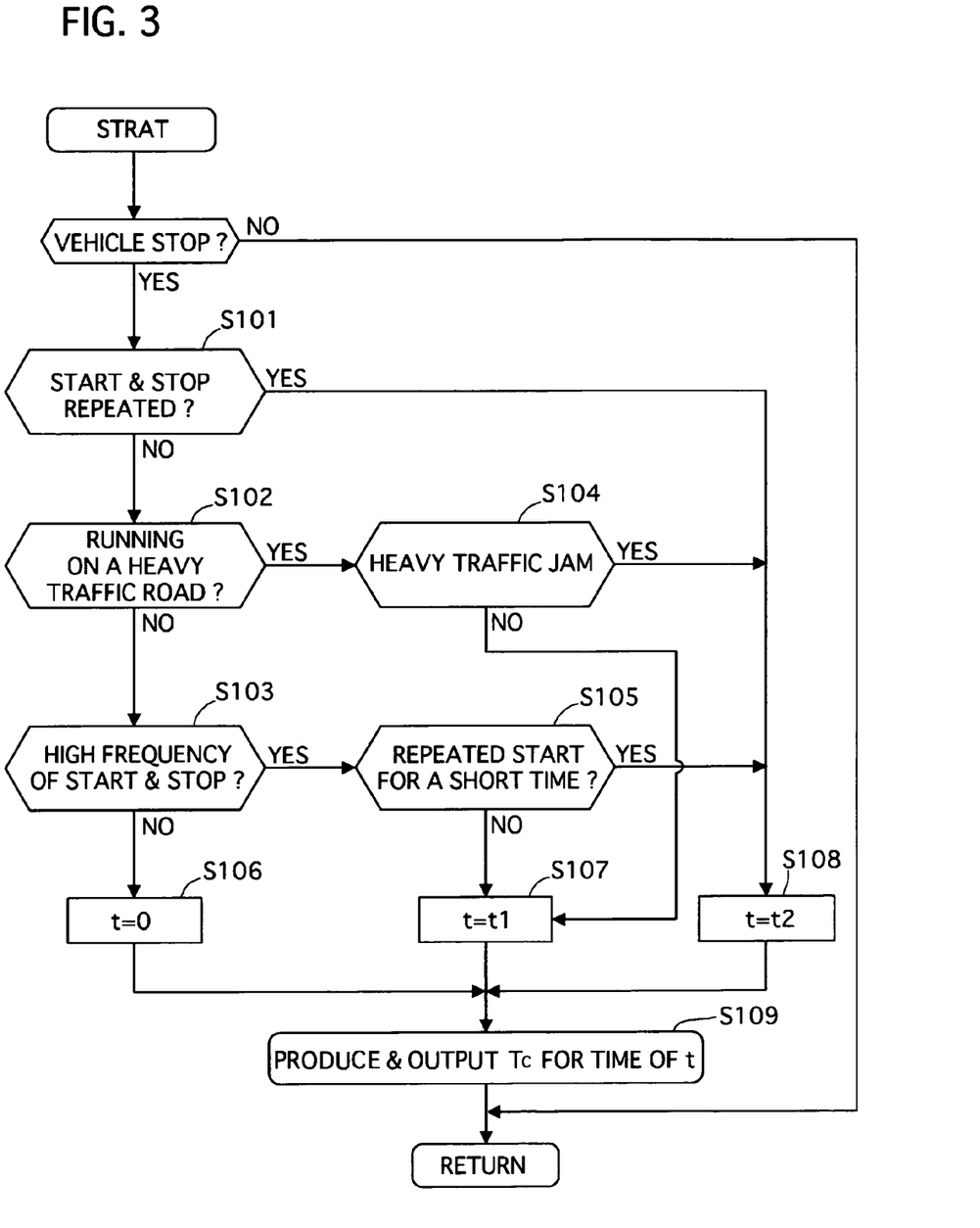
FIG. 3 is a flowchart of creep control executed in the transmission control unit shown in FIGS. 1 and 2.

The transmission control unit 40 executes creep control according to a flowchart shown in FIG. 3.

At step S100, the creep demand degree judging part 40A judges whether or not the motor vehicle is stopped by brake application, based on a brake signal and a vehicle speed signal, and if YES, the flow goes to step S101, while, if NO, the flow goes to RETURN.

At the step S101, the judging part 40A judges whether or not the vehicle repeatedly starts and stops immediately after the select lever 48 is shifted to a running select position, based on the brake signal, the vehicle speed signal, and a select position signal. If YES, the flow goes to step S108, while, if NO, the flow goes to step S102.

At the step S102, the judging part 40A judges whether or not the vehicle is on a traffic-jam road, based on a vehicle position signal and a traffic volume signal outputted from the navigation system with the VICS 42. If YES, the flow goes to step S104, while, if No, the flow goes to step S103.

At the step S103, the judging part 40A judges whether or not a start/stop frequency of the vehicle reaches that in traffic jam. If YES, the flow goes to step S105, while, if NO, the flow goes to step S106. Incidentally, the start/stop frequency is obtained by measuring a period from vehicle star to vehicle stop based on a vehicle speed signal at all times, and its measured value or its measured values are stored into a memory of the transmission control unit 40 so that the value or values can be used to calculate a driver's creep demand degree after its store into the memory.

At the step S104, the judging part 40A judges whether or not the road on which the vehicle runs at present is a heavy traffic one, based on the traffic volume signal and the vehicle position signal. If YES, it judges that a driver' creep torque demand degree is high because of heavy traffic jam, and the flow goes to step S108, while, if NO, it judges that his or her demand degree is middle, and the flow goes to step S107.

At the step S105, the judging part 40A judges whether or not the start and stop of the vehicle are repeated in a short time, a few minutes for example, and if YES, it judges that the demand degree is high, and the flow goes to the step S108, while, if NO, it judges that the demand degree is middle, and the flow goes to the step S107.

At the step S106, the creep time setting part 40B receives a creep demand degree signal indicating no demand for creep of the vehicle and sets creep time t to be zero, and then the flow goes to step S109.

At the step S107, the setting part 40B receives a creep demand degree signal indicating middle demand for the creep and sets the creep time t to be t1, which is larger than zero, and then the flow goes to the step S109.

At the step S108, the setting part 40B receives a creep demand degree signal indicating high demand for the creep and sets the creep time t to be t2, which is larger than t1, and then the flow goes to the step S109.

At the step S109, the creep torque producing part 40C controls the forward clutch solenoid 44 or the reverse brake solenoid 45 based on the creep time t and the select position so that creep torque Tc is produced and maintained for the creep time t determined based on the creep demand degree. When the creep time t is set zero, the clutch 20 and the brake 21 are completely disengaged, transmitting no torque therethrough. When the creep time t is set to be t1, one of the clutch 20 and the brake 21 slips more than when the time t is set to be t2, and provides weak creep torque. When the creep time t is set to be t2, one of the clutch 20 and the brake 21 slips less than when the time t is set to be t1, and provides strong creep torque.

Creep torques obtained by the starting device of the embodiment and the conventional one are compared to each other for understanding advantages of the embodiment.

Figure 4:
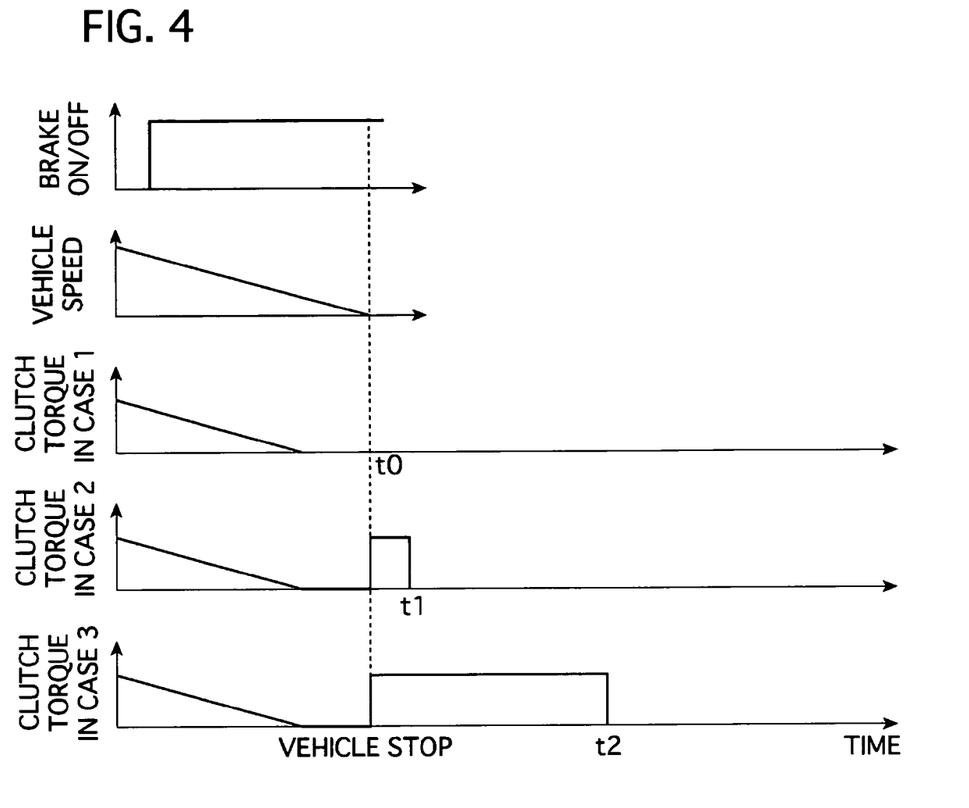
FIG. 4 is a time chart showing characteristics of clutch torques in three cases each obtained by the starting device of the embodiment before and after a motor vehicle is stopped by application of a brake.
Figure 5:
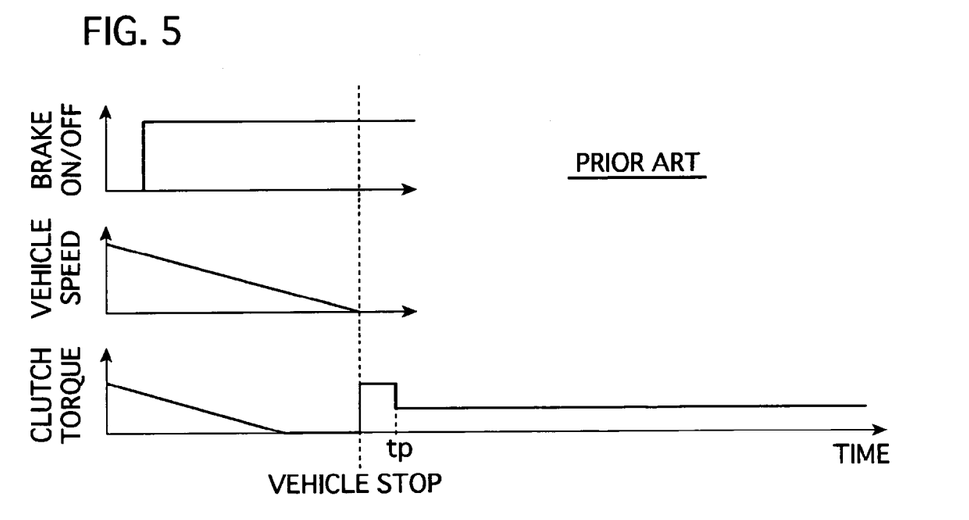
FIG. 5 is a time chart showing a characteristic of clutch torque obtained by a conventional starting device before and after a vehicle is stopped by application of a brake.

FIG. 4 is a time chart showing characteristics of clutch torques depending on different creep demand degrees, that is zero, middle, and high degrees, of the driver before and after the motor vehicle is stopped by application of a brake, and FIG. 5 is a time chart showing characteristic of clutch torque obtained by a conventional starting device before and after a vehicle is stopped by application of a brake.

In the conventional starting device, applying a brake decreases the vehicle speed down to zero as shown in an upper part indicating operation of a brake pedal and an intermediate part indicating clutch torque of FIG. 5. Then, creep control is performed so that strong creep torque is produced and maintained at first for fixed time tp and after the fixed time tp weak creep torque is produced and maintained, as shown in a lower part of FIG. 5. This continuous production of the creep torque causes deterioration of fuel economy and clutch durability in a case where a driver does not want creep. In addition, when restarting after the fixed time Tp, the creep torque is kept low, resulting in deterioration of start response.

Conversely, in the starting device of the embodiment, when the vehicle decreases its vehicle speed and stopped by application of a brake as shown in upper two parts of FIG. 4, creep control is executed in a case where the select lever 48 is kept being positioned in a running select position, such as a forward drive (D) position, a forward low drive (L) position, or a reverse drive (R) position.

The creep demand degree judging part 40A judges the creep demand degree and classifies it into three stages: no creep demand degree shown in the third part (case 1) of FIG. 4, a middle creep demand degree shown in the fourth part (case 2) of FIG. 4, and a high creep demand degree shown in the fifth part (case 3) of FIG. 4. As seen from FIG. 4, the creep time setting part 40B sets the creep time t to be zero in the case 1, t1 in the case 2, and t2 in the case 3, where t3>t2>0. The creep torque control part 40C controls the forward clutch solenoid 44 and the reverse brake solenoid 45, one of which produces and maintains creep torque for the creep time set by the creep time setting part. Therefore, the creep torque is obtained according to the driver's demand degree. FIG. 5 illustrates clutch torques only, but brake torque for creep is produced similarly.

The starting device of the embodiment has the following advantages.

It provides improvements of clutch/brake durability and fuel economy, and a favorable restart response at a time, since the creep is produced for the creep time set depending on a driver's creep demand degree.

The driver's creep demand degree is detected based on a start/stop frequency of the vehicle, or information on traffic volume obtained from an outside server including the VICS, or a frequency of shifting between the running position and the halt position of the select lever, which can provide more accurate driver's creep demand degree.

The start/stop frequency is obtained by measuring a period from vehicle star to vehicle stop based on a vehicle speed signal at all times, and its measured value or its measured values are stored into a memory of the transmission control unit 40 so that the value or values can be used by the creep demand degree judging part 40A to calculate a driver's creep demand degree after its store into the memory, which enables the calculation to be carried out quantitatively.

While the invention has been particularly shown and described with reference to preferred embodiments thereof, it will be understood by those skilled in the art that the foregoing and other changes in form and details can be made therein without departing from the spirit and scope of the invention.

For example, the creep demand degree judging part 40A may judge a creep demand degree of the driver based on a present position of a motor vehicle by using a navigation system. In this case, it may be constructed so that when the navigation system detects that the vehicle is near an auto park or a garage or in a building, the judging part 40A judges that the creep demand degree is high. Preferably, it functions after the vehicle comes into the above area from its outside.

The creep demand degree judging part 40A may judge a creep demand degree of the driver based on a vehicle speed. In this case, it may be constructed so that when an average vehicle speed or a maximum vehicle speed is kept within traffic jam speeds up to 25 Km/h for example, for a predetermined period, 5 minutes to 15 minutes for example, the judging part 40A judges that the creep demand degree is high.

A traffic information receiver may be replaced by other wireless devices for a traffic information system, instead of the VICS.

A friction element may be arranged at any one of an upstream side and a downstream side of a speed change mechanism including a variator and gear sets, which means that the friction element may be disposed between an engine and wheels.

A friction element may be arbitrary in the number of friction plates, its configuration, or its operation principle.

A press force applier for applying press force to a friction element may employ a device using other power, such as electric power, instead of using hydraulic power obtained by the forward clutch solenoid 44, the reverse brake solenoid 45, and the others of the embodiment. Its press force may engage a friction element by application of the press force or release of it.

A transmission used in the invention is not limited to the above-described belt-type CVT of the embodiment, and may employ a toroidal-variator type CVT, or other type transmissions.

The entire contents of Japanese Patent Application No. 2004-166180 filed Jan. 3, 2004 is incorporated herein by reference.

What is claimed is:

1. A starting device for motor vehicles comprising:
a friction element arranged between an engine and wheels and capable of transmitting torque between the engine and the wheels;
a press force applier capable of applying press force to the friction element; and
a control unit that controls the press force so that a torque transmission state of the friction element can be changed from a disengagement state of interrupting torque flow between the engine and the wheels to an engagement state of completely transmitting the torque therebetween without a slippage of the friction element, wherein
the control unit includes a creep demand degree judging means that judges a creep demand degree of a driver for starting a motor vehicle after substantial stop of the motor vehicle with applying brake force to the wheels and outputs a creep demand degree signal, a creep time setting means that sets creep time based on the creep demand degree signal and outputs a creep time signal, and a creep torque producing means that produces creep torque by controlling the press force to obtain a slipping state of the friction element for a period determined based on the creep time signal.

2. A starting device according to claim 1, wherein
the creep demand degree judging means calculates a start/stop frequency of alternate start and stop of the motor vehicle and judges the creep demand based on the start/stop frequency so that the creep demand degree becomes higher as the start/stop frequency becomes higher, and
the creep time setting means sets the creep timer based on the creep demand signal outputted from the creep demand degree judging means so that the creep time becomes longer as the creep demand degree becomes higher.

3. A starting device according to claim 2, further comprising a vehicle speed sensor that detects a vehicle speed of the motor vehicle and outputs a vehicle speed signal, wherein
the creep demand degree judging means obtains times related to a start of the motor vehicle and a stop following the start of the motor vehicle, based on the vehicle speed signal, and computes duration from the start to the stop of the motor vehicle to calculate the start/stop frequency.

4. A starting device according to claim 2, further comprising an accelerator sensor that detects a position of an accelerator pedal and outputs an accelerator position signal and a brake sensor that detects application of a brake and outputs a brake signal, wherein
the creep demand degree judging means detects a press of the accelerator pedal and the application of the brake, based on the accelerator position signal and the brake signal, and computes duration from the start to the stop of the motor vehicle to calculate the start/stop frequency.

5. A starting device according to claim 2, further comprising a traffic information receiver that receives information on traffic volume and outputs a traffic volume information signal, wherein
the creep demand degree judging means judges the start/stop frequency based on the traffic volume signal so that the creep demand degree becomes higher as the traffic volume becomes higher.

6. A starting device according to claim 2, further comprising a select position sensor that detects a select position of a select lever and outputs a select position signal, wherein
the creep demand degree judging means calculates a shift frequency of the select lever switching the select positions between a running select position and a non-running select position, based on the select position signal and judges the creep demand degree based on the shift frequency so that the creep demand degree becomes higher as shift frequency becomes higher.

7. A starting device according to claim 2, wherein
the friction element is composed of a forward clutch and a reverse brake that control a transmission arranged between the engine and the wheels.

8. A starting device according to claim 1, further comprising a traffic information receiver that receives information on traffic volume and outputs a traffic volume information signal, wherein
the creep demand degree judging means judges the start/stop frequency based on the traffic volume signal so that the creep demand degree becomes higher as the traffic volume becomes higher.

9. A starting device according to claim 8, further comprising a select position sensor that detects a select position of a select lever and outputs a select position signal, wherein
the creep demand degree judging means calculates a shift frequency of the select lever switching the select positions between a running select position and a non-running select position, based on the select position signal and judges the creep demand degree based on the shift frequency so that the creep demand degree becomes higher as shift frequency becomes higher.

10. A starting device according to claim 8, wherein
the friction element is composed of a forward clutch and a reverse brake that control a transmission arranged between the engine and the wheels.

11. A starting device according to claim 1, further comprising a select position sensor that detects a select position of a select lever and outputs a select position signal, wherein
the creep demand degree judging means calculates a shift frequency of the select lever switching the select positions between a running select position and a non-running select position, based on the select position signal and judges the creep demand degree based on the shift frequency so that the creep demand degree becomes higher as shift frequency becomes higher.

12. A starting device according to claim 11, wherein
the friction element is composed of a forward clutch and a reverse brake that control a transmission arranged between the engine and the wheels.

13. A starting device according to claim 1, further comprising a vehicle speed sensor that detects a vehicle speed of the motor vehicle and outputs a vehicle speed signal, wherein
the creep demand degree judging means computes a maximum vehicle speed based on the vehicle speed signal and judges the creep demand degree based on whether the maximum vehicle speed is within speeds up to a traffic jam vehicle speed.

14. A starting device according to claim 13, further comprising a traffic information receiver that receives information on traffic volume and outputs a traffic volume information signal, wherein
the creep demand degree judging means judges the start/stop frequency based on the traffic volume signal so that the creep demand degree becomes higher as the traffic volume becomes higher.

15. A starting device according to claim 13, further comprising a select position sensor that detects a select position of a select lever and outputs a select position signal, wherein the creep demand degree judging means calculates a shift frequency of the select lever switching the select positions between a running select position and a non-running select position, based on the select position signal and judges the creep demand degree based on the shift frequency so that the creep demand degree becomes higher as shift frequency becomes higher.

16. A starting device according to claim 1, further comprising a vehicle speed sensor that detects a vehicle speed of the motor vehicle and outputs a vehicle speed signal, wherein the creep demand degree judging means computes an average vehicle speed based on the vehicle speed signal and judges the creep demand degree based on whether the average vehicle speed is within speeds up to a traffic jam vehicle speed.

17. A starting device according to claim 16, further comprising a traffic information receiver that receives information on traffic volume and outputs a traffic volume information signal, wherein the creep demand degree judging means judges the start/stop frequency based on the traffic volume signal so that the creep demand degree becomes higher as the traffic volume becomes higher.

18. A starting device according to claim 1, further comprising a navigation system that detects a present position of the motor vehicle and outputs a vehicle position signal, wherein the creep demand degree judging means judges based on the vehicle position sensor that the creep demand degree is high when the present position is at one of an inside of an auto park, vicinities of a garage, and an inside of a building.

19. A starting device according to claim 18, wherein the creep demand degree judging means calculates a start/stop frequency of alternate start and stop of the motor vehicle and judges the creep demand based on the start/stop frequency so that the creep demand degree becomes higher as the start/stop frequency becomes higher, and the creep time setting means sets the creep timer based on the creep demand signal outputted from the creep demand degree judging means so that the creep time becomes longer as the creep demand degree becomes higher.

20. A starting device according to claim 1, wherein the friction element is composed of a forward clutch and a reverse brake that control a transmission arranged between the engine and the wheels.

* * * * *